United States Patent
Kivity (10) Patent No.: US 9,075,795 B2
(45) Date of Patent: Jul. 7, 2015

(54) INTERPROCESS COMMUNICATION (71) Applicant: Avi Kivity, Tel Aviv (IL)

(72) Inventor: Avi Kivity, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 142 days.

(21) Appl. No.: 13/684,034

(22) Filed: Nov. 21, 2012

(65) Prior Publication Data

US 2014/0143452 A1   May 22, 2014

(51) Int. Cl.
*G06F 13/28* (2006.01)
(52) U.S. Cl.
CPC .......................................... *G06F 13/28* (2013.01)
(58) Field of Classification Search
None
See application file for complete search history.

(56) References Cited

U.S. PATENT DOCUMENTS

| | | | |
|---|---|---|---|
| 4,620,279 A * | 10/1986 | Read et al. | 710/22 |
| 7,251,747 B1 * | 7/2007 | Bean et al. | 714/18 |
| 8,228,536 B2 * | 7/2012 | Suse | 358/1.15 |
| 2013/0318296 A1 * | 11/2013 | Chiba et al. | 711/112 |
| 2014/0004793 A1 * | 1/2014 | Bandyopadhyay et al. | 455/41.1 |

* cited by examiner

*Primary Examiner* — Kris Rhu
(74) *Attorney, Agent, or Firm* — Lowenstein Sandler LLP (57) ABSTRACT

A system and methods for sending data from one process to another process (i.e., interprocess communication) are disclosed. In accordance with one embodiment, an operating system recognizes a request by a sending process to perform an asynchronous write to a pipe, and a request by a receiving process to perform an asynchronous read from the pipe, occurring in either order. The operating system then selects one of a plurality of mechanisms for providing the data to the receiving process.

20 Claims, 6 Drawing Sheets

INTERPROCESS COMMUNICATION

TECHNICAL FIELD

This disclosure relates to operating systems, and more particularly, to interprocess communication.

BACKGROUND

An operating system (OS) is a set of programs that manage computer hardware resources and provide common services for application software. For hardware functions such as input and output and memory allocation, the operating system typically acts as an intermediary between application programs and hardware. Operating systems may be found on a variety of devices, including desktop computers, servers, smartphones, video game consoles, and so forth.

Operating systems typically provide one or more mechanisms for interprocess communication (i.e., sending data from one process to another.) Two such mechanisms are typically employed when there is a need to send large amounts of data: shared memory, and pipes. In the shared memory approach, a chunk of memory is made accessible to both a sending process and a receiving process, enabling efficient access to memory by both processes without requiring any copying. This approach, however, suffers from potential security and reliability issues, as malicious or malfunctioning processes are granted access to a large amount of memory and may alter its contents with undesirable consequences.

In the pipe approach, a sending process designates a first area of memory containing data to be sent, and a receiving process designates a second area of memory where the data is to be placed, and the operating system copies the data from the sending process to the receiving process. This approach is more reliable than using shared memory; however it incurs two copies, which reduces efficiency.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein is a system and methods for sending data from one process to another process (i.e., interprocess communication). In one embodiment, an operating system recognizes the following two sequences:

Sequence 1
A request by a sending process to perform an asynchronous write to a pipe (referred to subsequently as an "asynchronous write request to the pipe")
A request by a receiving process to perform an asynchronous read from the pipe (referred to subsequently as an "asynchronous read request from the pipe")

Sequence 2
An asynchronous read request from a pipe by a receiving process
An asynchronous write request to the pipe by a sending process In other words, in this embodiment the operating system recognizes an asynchronous write request to a pipe by a sending process and an asynchronous read request from the pipe by a receiving process, in either order. When the first event (either a read request or a write request) is detected by the operating system, the event is held in a queue, and when the matching second event is detected, the operating system initiates a method of providing the data written by the sending process to the receiving process. In accordance with this method, one of a plurality of mechanisms is selected for providing the data. In particular, a first mechanism employs a Direct Memory Access (DMA) engine to provide the data, and a second and a third mechanism provide the data via instructions from the operating system to the central processing unit (CPU).

Advantageously, embodiments of the method are capable of selecting which of the plurality of mechanisms is most efficient for each particular data transfer. For example, in one instance a mechanism that uses a Direct Memory Access (DMA) engine may be most efficient, while in another instance a mechanism that uses a central processing unit (CPU) may be most efficient. Details concerning the various mechanisms, as well as the criteria and logic employed for selecting a particular mechanism, are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting", "selecting", "providing", "copying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
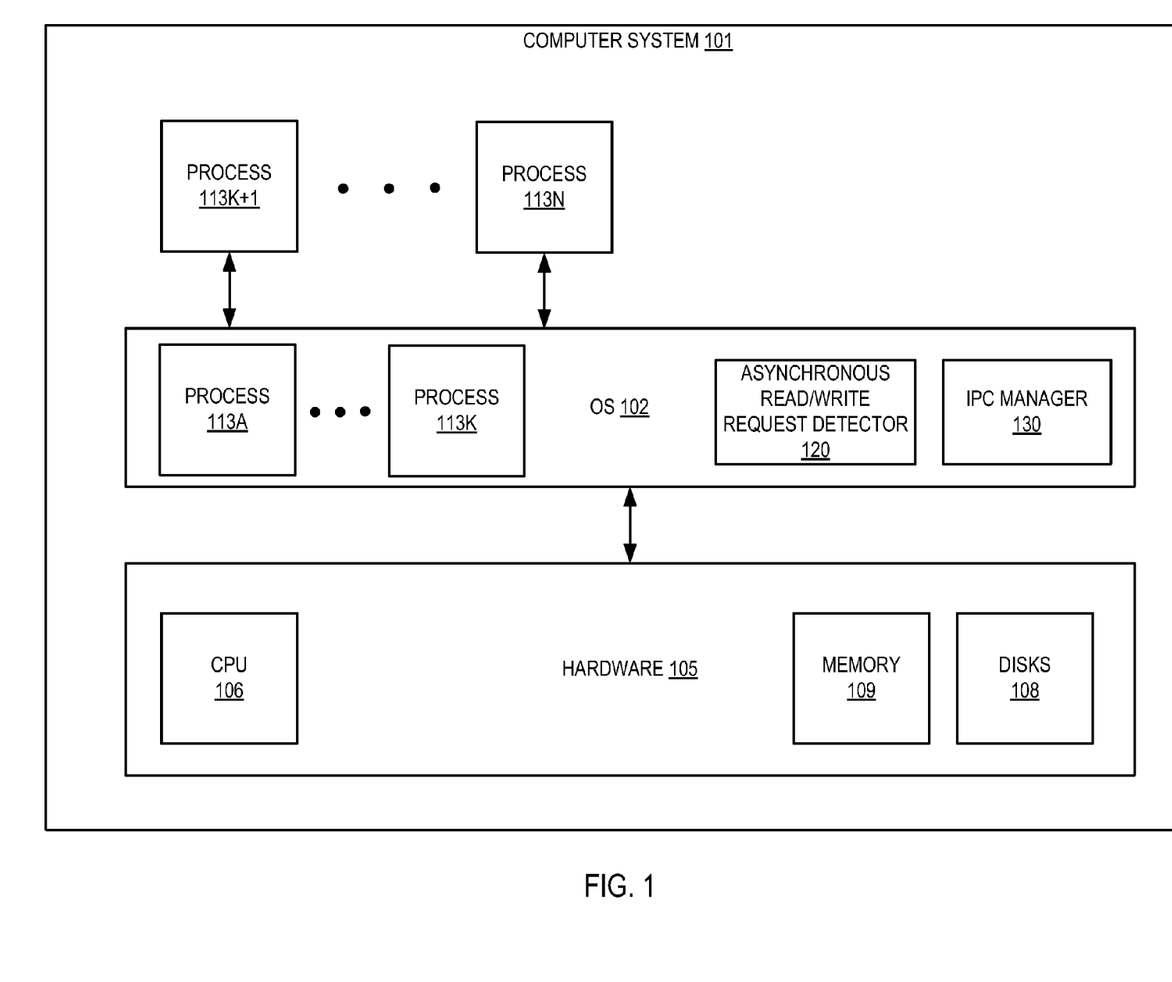
FIG. 1 depicts an exemplary computer system architecture, in accordance with an embodiment of the present invention.

FIG. 1 depicts an exemplary architecture of a computer system 101, in accordance with an embodiment of the present invention. As shown in FIG. 1, the computer system 101 comprises a central processing unit (CPU) 106, memory 109, disks 108, direct memory access (DMA) engine 112, other hardware components on an underlying hardware platform 105, and executing processes 113-1 through 113-N, where N is a positive integer greater than or equal to two, interconnected as shown.

Memory 109 may include volatile memory devices (e.g., random access memory (RAM)), non-volatile memory devices (e.g., flash memory), and/or other types of memory devices. The computer system 101 runs an operating system (OS) 102 to manage system resources, including access to the memory 109 and disks 108.

DMA engine 112 is a dedicated data transfer device that enables hardware modules within the computer (e.g., disk drive controllers, graphics cards, network cards, sound cards, etc.) to access system memory independently of (and therefore without burdening) the central processing unit (CPU). DMA engine 112 is capable of reading incoming data from a hardware module and of storing the data in system memory for later retrieval by the CPU. DMA engine 112 is also capable of reading outgoing data from system memory and of writing the data into a buffer of a hardware module for use by the hardware module. Additionally, DMA engine 112 can perform data copies and scatter/gather operations, by which data is transferred to and from multiple memory areas in a single direct memory access transaction.

Processes 113-1 through 113-N may include system processes, user processes, application processes, and any other processes that can be part of the OS 102 or outside of the OS 102. The OS 102 includes an asynchronous read/write request detector 120 to detect when an asynchronous write request to a pipe and an asynchronous read request from the pipe occur, in either order, and an interprocess communication (IPC) manager 130 to manage data transfers between processes 113-1 through 113-N. The operation of asynchronous read/write request detector 120 and IPC manager 130 will be described in greater detail with references to FIGS. 2 through 6.

In one embodiment, IPC manager 130 transfers data from a sending process to a receiving process via one of three mechanisms. In accordance with the first mechanism, IPC manager 130 instructs DMA engine 112 to transfer data from the sending process to the receiving process, thereby avoiding any copying by CPU 106. In accordance with the second mechanism, IPC manager 130 instructs CPU 106 to transfer data from the sending process to the receiving process. In accordance with the third mechanism, IPC manager 130 instructs CPU 106 to copy data from the sending process to a buffer, and subsequently to copy data from the buffer to the receiving process. After the data has been provided to the receiving process, regardless of by which mechanism, IPC manager 130 notifies both the sending process and the receiving process that the data transfer has been performed.

In some embodiments, IPC manager 130 also comprises logic for selecting one of a plurality of interprocess communication mechanisms. In some such embodiments, IPC manager 130 selects one of the three IPC mechanisms described above based on one or more of the following criteria:

whether DMA engine 112 is available;
the current load of DMA engine 112, when DMA engine 112 is available; or
the size of the data to be sent.

In particular, in one such embodiment IPC manager 130 first determines whether DMA engine 112 is available, and if so, determines the current load of DMA engine 112. In one example, operating system 102 manages DMA engine 112 via a device driver that queues requests to DMA engine 112 and processes completion responses from DMA engine 112 (e.g., via interrupts, etc.). In accordance with this example, the current load of DMA engine 112 is the number of requests that are queued but not yet completed.

If the current load is below a particular threshold, then IPC manager 130 instructs DMA engine 112 to transfer data from the sending process to the receiving process, thereby avoiding any performance penalty to CPU 106. If DMA engine 112 is not available, or if the current load of DMA engine 112 is above a threshold, then IPC manager performs one of two IPC mechanisms that use CPU 106. In one such embodiment IPC manager 130 selects one of the following two IPC mechanisms:

using CPU 106 to send data directly from the sending process to the receiving process (referred to here as the "direct-transfer" mechanism), or using CPU 106 to copy data from the sending process to a buffer, and to copy data from the buffer to the receiving process (referred to here as the "copy-via-buffer" mechanism)

based on the size of the data to be transferred. In some such embodiments, the direct-transfer mechanism is selected when the data to be copied is above a particular size threshold, and otherwise, the copy-via-buffer mechanism is selected. As is described in more detail below with respect to FIGS. 4 and 5, the direct-transfer mechanism is used only when the data is sufficiently large because it involves additional steps, in comparison to the copy-via-buffer mechanism; consequently, the savings that results from using a single transfer versus two transfers—which grows with the size of the data transferred—must be at least as great as the penalty incurred by these extra steps.

Figure 2:
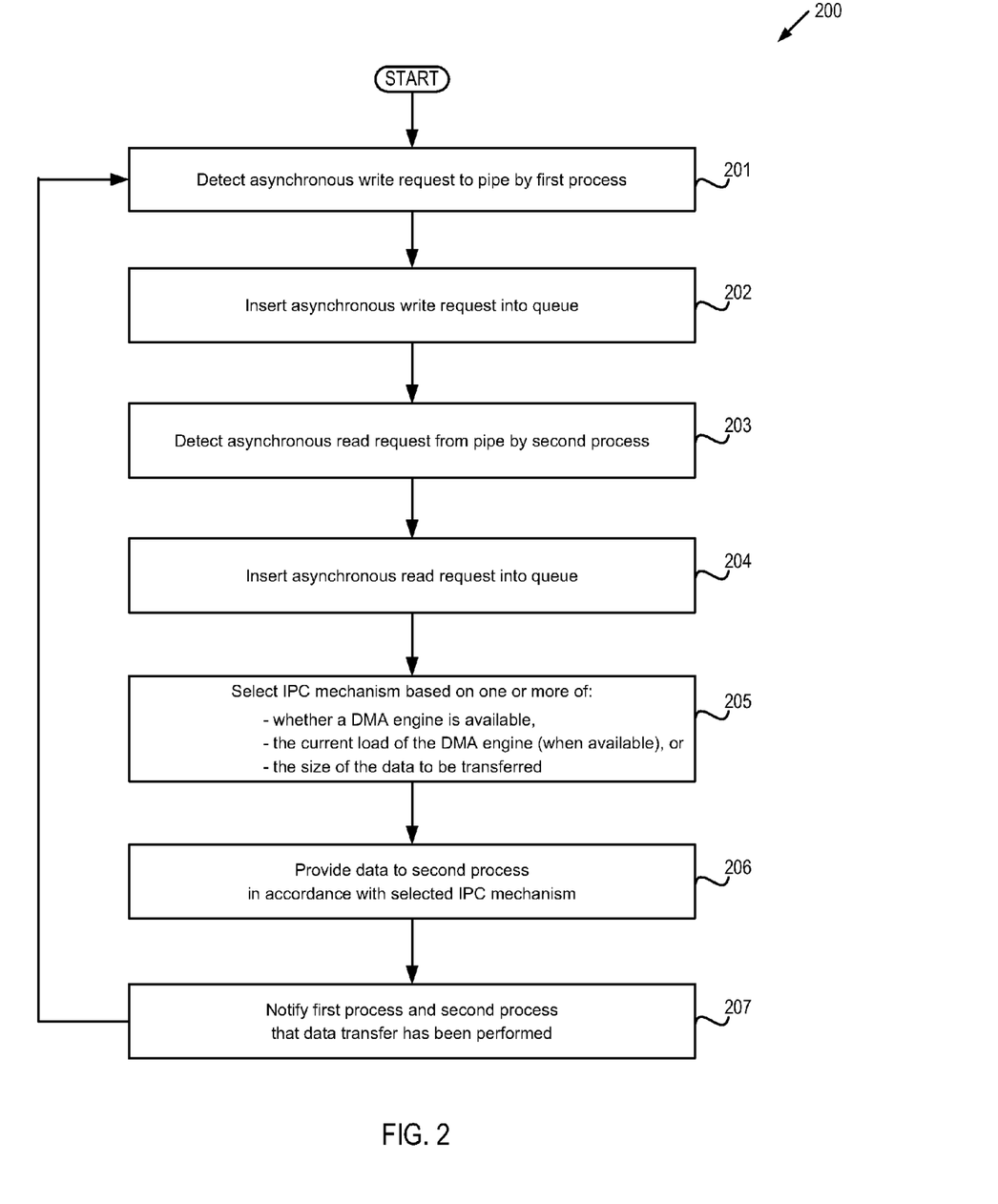
FIG. 2 depicts a flow diagram of one embodiment of a method for sending data from a first process to a second process.

FIG. 2 depicts a flow diagram of one embodiment of a method 200 for sending data from a first process to a second process. The method is performed by processing logic that may comprise hardware (circuitry, dedicated logic, etc.), software (such as is run on a general purpose computer system or a dedicated machine), or a combination of both. In one embodiment, the method is performed by the computer system 101 of FIG. 1, while in some other embodiments, some or all of the method might be performed by another machine. It should be noted that blocks depicted in FIG. 2 can be performed simultaneously or in a different order than that depicted.

At block 201, a request by a first process to perform an asynchronous write of data to a pipe is detected. It should be noted that the asynchronous write request may or may not be a gathering write. In accordance with one embodiment, block 201 is performed by asynchronous read/write request detector 120.

At block 202, the asynchronous write request is inserted into a queue. At block 203, an asynchronous read request from the pipe by a second process is detected. It should be noted that the asynchronous read request may or may not be a scattering read. In accordance with one embodiment, block 203 is performed by asynchronous read/write request detector 120.

At block 204, the asynchronous read request is inserted into the queue. At block 205, an IPC mechanism is selected for sending the data from the first process to the second process, where the selection is based on one or more of the following:
whether a DMA engine is available;
the current load of the DMA engine, when the DMA engine is available; or
the size of the data to be sent from the first process to the second process.

An embodiment of block 205 is described in more detail below and with respect to FIG. 3. In accordance with one embodiment, block 205 is performed by IPC manager 130.

At block 206, the data is provided to the second process in accordance with the IPC mechanism that was selected at block 205. At block 207, the first process and the second process are notified that the data transfer has been performed. After block 207, execution continues back at block 201.

As described above, in some instances an asynchronous read request from a pipe may occur (and therefore may be detected) before a matching asynchronous write request to the pipe, in which case the order of blocks 201 through 204 would change accordingly. In other words, the asynchronous read request is first detected and inserted into the queue, and then when the matching asynchronous write request is detected and inserted into the queue, the selection process of block 205 is executed.

Figure 3:
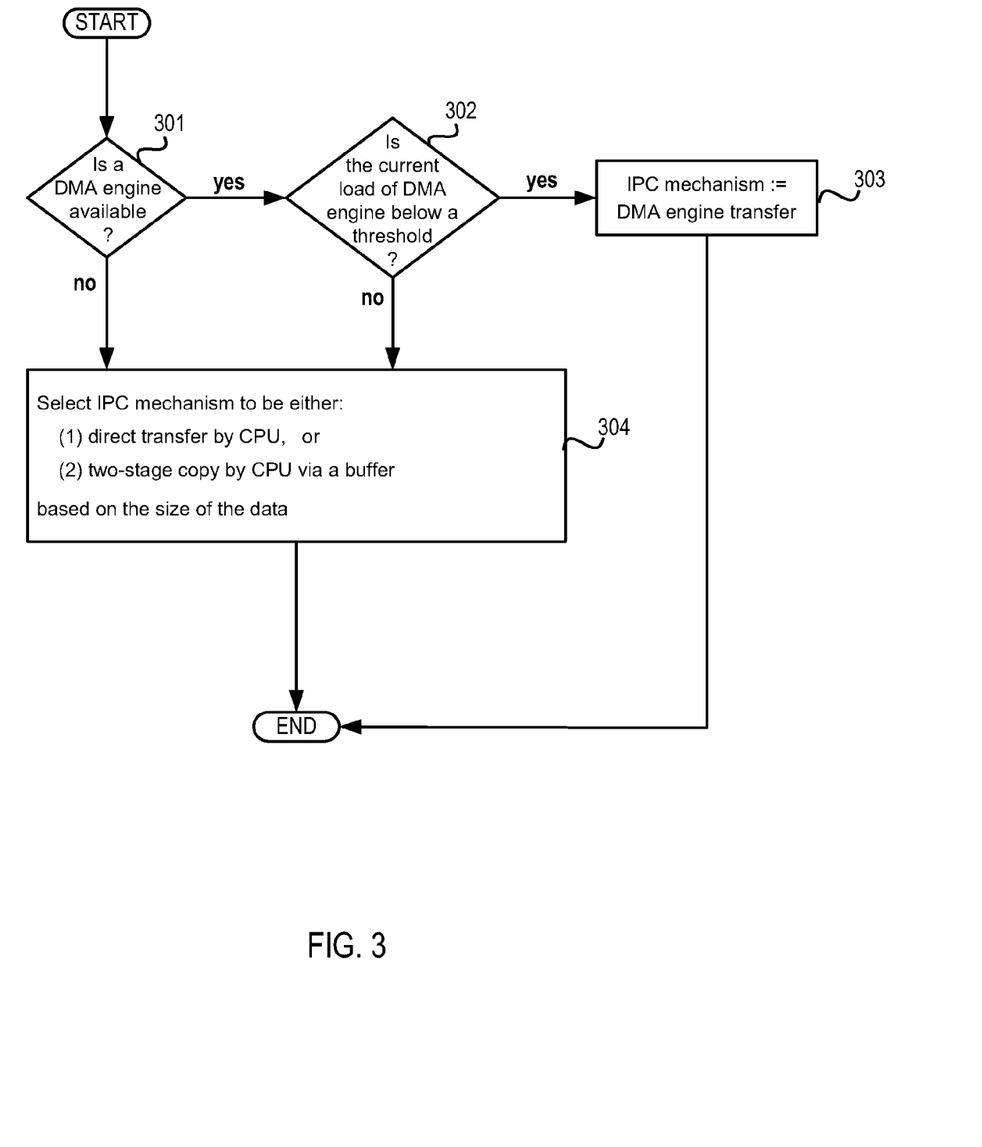
FIG. 3 depicts a flow diagram of one embodiment of a method for selecting one of a plurality IPC mechanisms.

FIG. 3 depicts a flow diagram of one embodiment of a method for selecting one of a plurality of interprocess communication mechanisms. It should be noted that blocks depicted in FIG. 3 can be performed simultaneously or in a different order than that depicted.

Block 301 checks whether a DMA engine is available; if so, then execution proceeds to block 302, otherwise execution continues at block 304.

At block 302, the current load of the available DMA engine is compared to a threshold; if the load is below the threshold, then execution proceeds to block 303, otherwise execution continues at block 304.

At block 303 the IPC mechanism is selected to be the DMA engine transfer mechanism. After block 303, the method of FIG. 3 terminates.

At block 304, the IPC mechanism is selected to be one of the following:
using a CPU to send data directly from the first process to the second process (i.e., the direct-transfer mechanism), or
using a CPU to copy data from the first process to a buffer, and then from the buffer to the second process (i.e., the copy-via-buffer mechanism),
where the selection is based on the size of the data to be sent from the first process to the second process.

For example, as described above, in some embodiments the direct-transfer mechanism might be selected when the size of the data to be sent is above a particular threshold, and otherwise, the copy-via-buffer mechanism is selected. The direct-transfer mechanism is described in more detail below with respect to FIGS. 4 and 5.

It should be noted that in some embodiments the methods of FIGS. 2 through 5 may be adapted for use when the second operation (i.e., a read request from a pipe after a write request to the pipe, or a write request to the pipe after a read request from the pipe) is synchronous. In some such embodiments, when the second operation is synchronous, either the DMA-based mechanism or one of the two non-DMA mechanisms may be selected, in the same manner as described above when both operations are asynchronous, while in some other such embodiments, only one of the non-DMA mechanisms may be selected. Further, some such embodiments adapted for use with synchronous operations may perform the same logic as that described above for selecting an interprocess communication method, while some other embodiments might employ alternative or additional logic for selecting the interprocess communication method. Still further, some other embodiments of the present invention might employ different IPC mechanisms—either DMA-based or non-DMA-based—instead of, or in addition to, the mechanisms described above.

It should further be noted that in some other examples, it may be desirable to use an IPC mechanism other than a DMA engine transfer even when a DMA engine is available (e.g., when the data to be copied is below a certain size, etc.). In such examples, the method of FIG. 3 may be modified accordingly to consider additional criteria (e.g., the size of the data to be copied, etc.) in conjunction with the availability of a DMA engine and the current load of an available DMA engine when determining whether to branch to block 303 or block 304.

Figure 4:
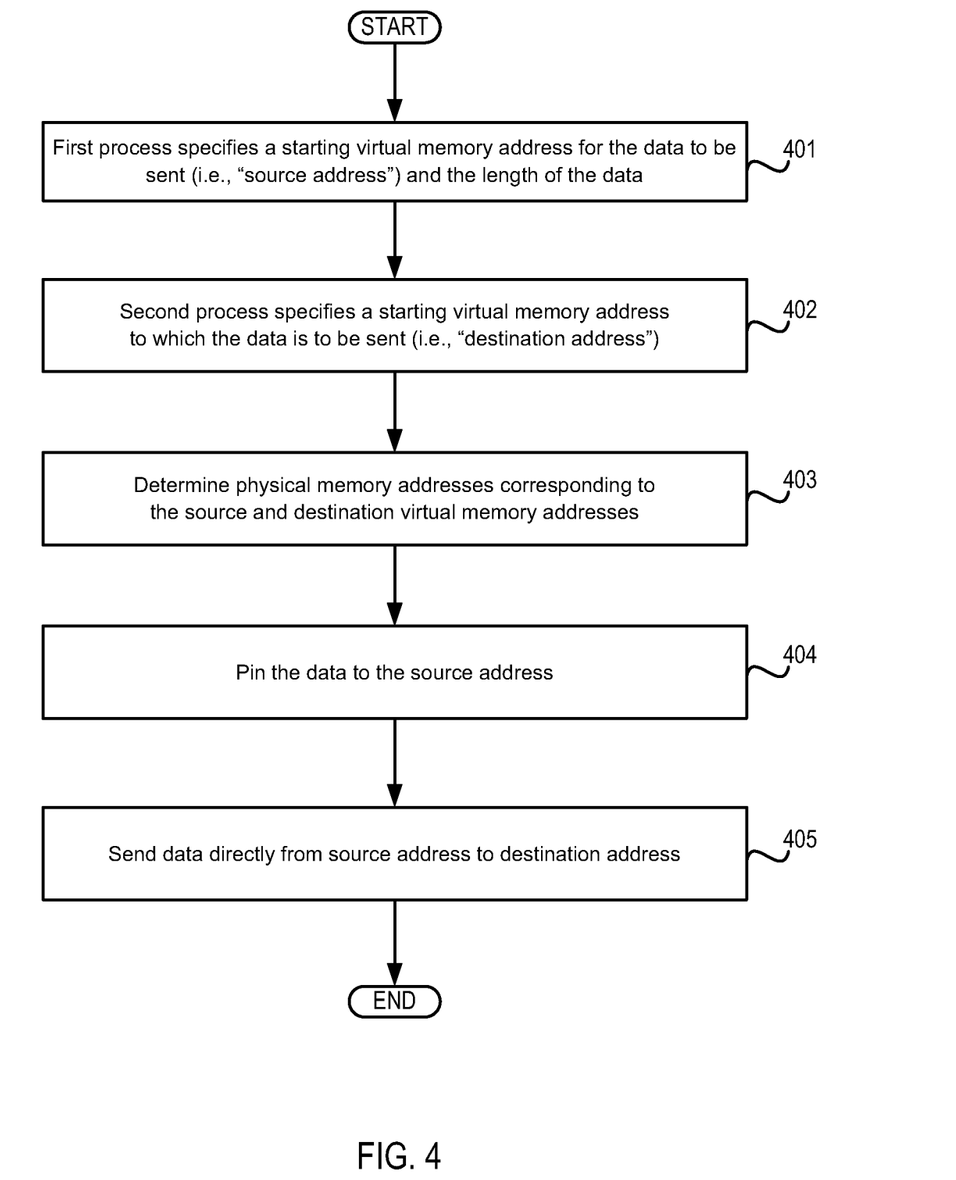
FIG. 4 depicts a flow diagram of one embodiment of an IPC mechanism for sending data directly from a first process to a second process using a central processing unit.

FIG. 4 depicts a flow diagram of one embodiment of an IPC mechanism for sending data directly from a first process to a second process using a central processing unit. This embodiment is applicable to operating systems in which the entire physical memory is mapped at all times (e.g., 32-bit Linux kernels, etc.). It should be noted that blocks depicted in FIG. 4 can be performed simultaneously or in a different order than that depicted.

At block 401, a first (i.e., sending) process specifies a starting virtual memory address for the data to be sent (i.e., a source address), and the length of the data. At block 402, a second (i.e., receiving) process specifies a starting virtual memory address to which the data is to be sent (i.e., a destination address).

At block 403, physical memory addresses corresponding to the source and destination virtual memory addresses are determined (e.g., by consulting a paging table, etc.), in case one or both of the virtual memory addresses become invalid (e.g., due to a delay before the copying starts, due to use of the DMA engine, etc.).

At block 404, the data is pinned to the source address (e.g., by incrementing a reference count, thereby preventing the page from being swapped out or otherwise disturbed, etc.). At block 405, the data is sent directly from the source address to the destination address.

Figure 5:
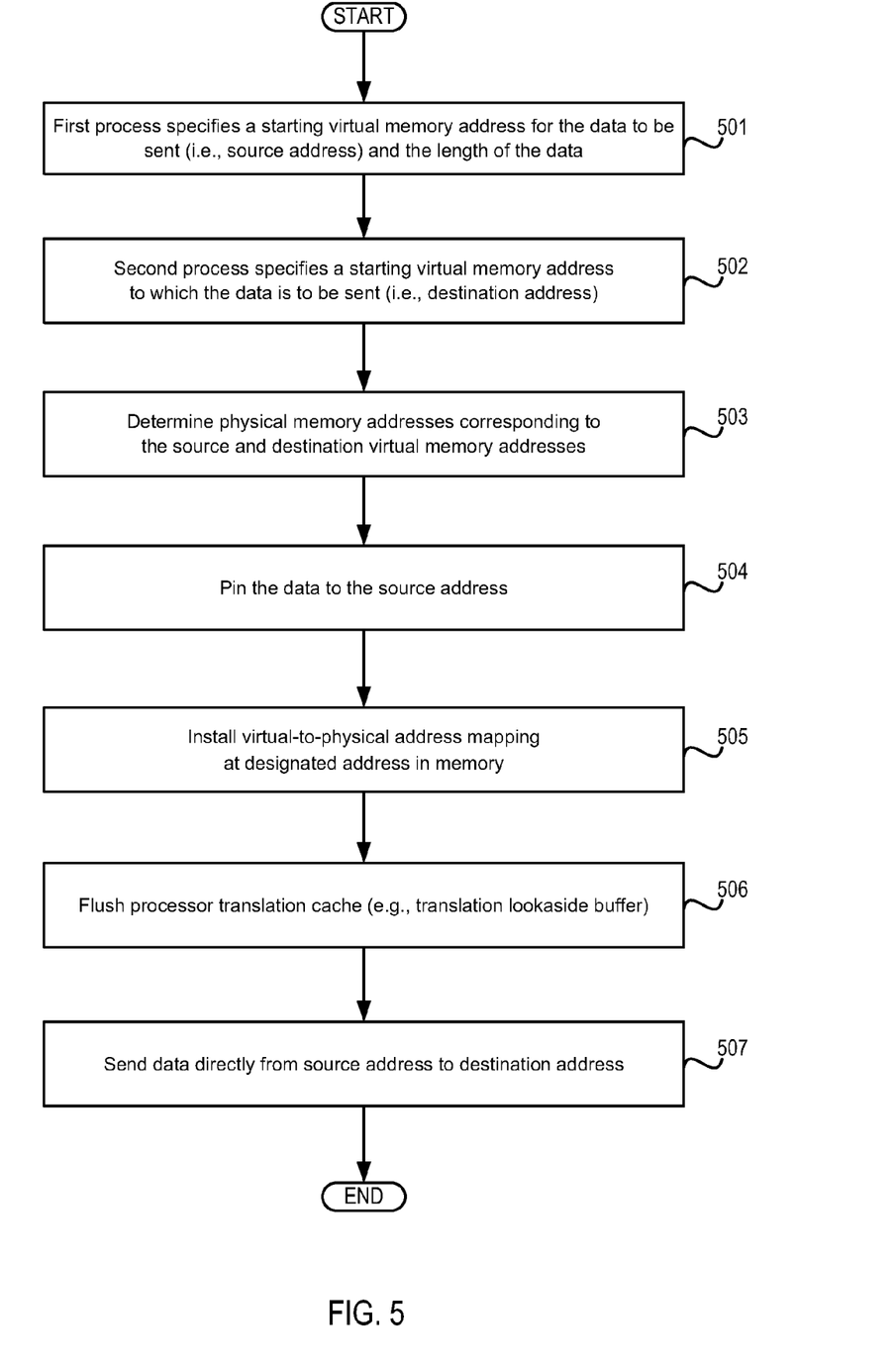
FIG. 5 depicts a flow diagram of another embodiment of an IPC mechanism for sending data directly from a first process to a second process using a central processing unit.

FIG. 5 depicts a flow diagram of another embodiment of an IPC mechanism for sending data directly from a first process to a second process using a central processing unit. This embodiment is applicable to operating systems in which the entire physical memory is not mapped at all times (e.g., 32-bit Linux kernels, etc.). The embodiment of FIG. 5 is similar to the embodiment of FIG. 4, with the exception that it includes additional blocks between the pinning and transferring of the data. It should be noted that blocks depicted in FIG. 5 can be performed simultaneously or in a different order than that depicted.

At block 501, a first process specifies a starting virtual memory address for the data to be sent (i.e., a source address), and the length of the data. At block 502, a second process specifies a starting virtual memory address to which the data is to be sent (i.e., a destination address).

At block 503, physical memory addresses corresponding to the source and destination virtual memory addresses are determined (e.g., by consulting a paging table, etc.), in case one or both of the virtual memory addresses become invalid (e.g., due to a delay before the copying starts, due to use of the DMA engine, etc.). At block 504, the data is pinned to the source address (e.g., by incrementing a reference count, thereby preventing the page from being swapped out or otherwise disturbed, etc.).

At block 505, a virtual-to-physical address mapping is installed at a designated address in memory, and at block 506, the processor translation cache (e.g., a translation lookaside buffer [TLB]) is flushed. At block 507, the data is sent directly from the source address to the destination address.

Figure 6:
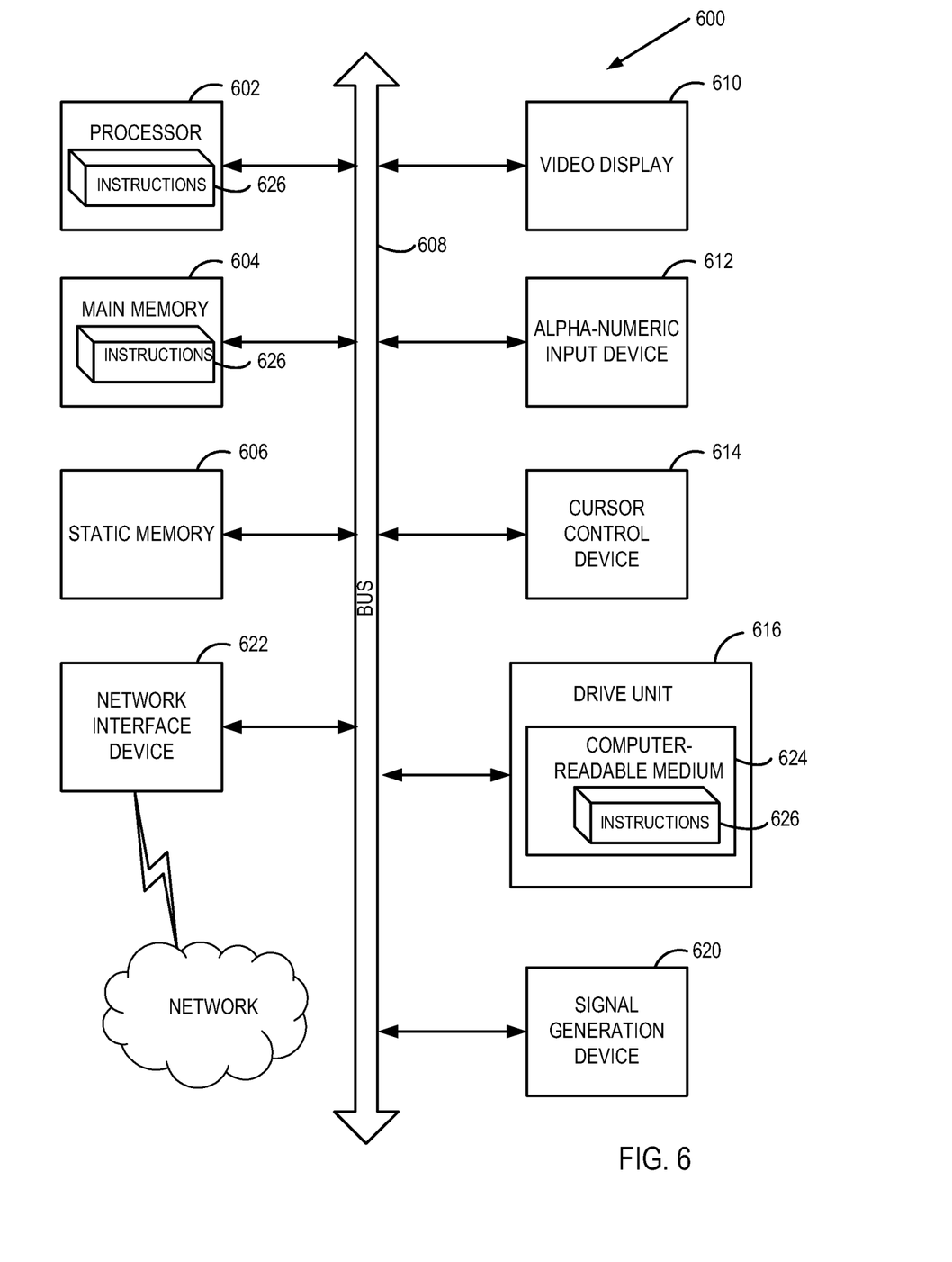
FIG. 6 depicts a block diagram of an illustrative computer system operating in accordance with embodiments of the invention.

FIG. 6 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 606.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions corresponding to the methods of FIGS. 2 through 5, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a processor of a computer system, a request by a first process to perform an asynchronous write of one or more data items to a pipe;
   detecting, by the processor, a request by a second process to perform an asynchronous read from the pipe; and
   selecting, by the processor, one of a direct memory access engine of the computer system or the processor to provide the one or more data items to the second process;
   wherein the selection is in view of a size of the one or more data items.

2. The method of claim 1 wherein the selection is also in view of at least one of:
   an availability of the direct memory access engine; or
   an load of the direct memory access engine.

3. The method of claim 1 wherein the computer system further comprises:
   a memory, and
   an operating system that submits instructions to the processor; and wherein providing the one or more data items to the second process by the direct memory access engine comprises:
   (a) copying, via the operating system, the one or more data items from the first process to a buffer in the memory, and copying, via the operating system, the one or more data items from the buffer to the second process; and
   (b) providing the one or more data items directly via the operating system.

4. The method of claim 3 wherein the providing the one or more data items directly via the operating system comprises:
   determining a physical memory address of the one or more data items in view of a virtual memory address specified by the first process,
   pinning the one or more data items, and
   providing the one or more data items to the second process.

5. The method of claim 1 further comprising:
   providing, by the computer system, the one or more data items to the second process via the selected device; and
   notifying the first process and the second process of the providing after the providing has completed.

6. The method of claim 1, wherein the processor is a central processing unit.

7. A method comprising:
   detecting, by a processor of a computer system, a request by a first process to perform an asynchronous write of one or more data items to a pipe;
   detecting, by the computer system, a request by a second process to perform an asynchronous read from the pipe; and
   selecting, by the computer system, one of a direct memory access engine of the computer system or the processor of the computer system to provide the one or more data items to the second process;
   wherein the selection is in view of one or both of:
   an availability of the direct memory access engine, and
   an load of the direct memory access engine.

8. The method of claim 7, wherein the computer system further comprises:
   a memory, and
   an operating system to submit instructions to the processor; and wherein providing the one or more data items to the second process by the direct memory access engine comprises:
   (a) copying, via the operating system, the one or more data items from the first process to a buffer in the memory, and copying, via the operating system, the one or more data items from the buffer to the second process; and
   (b) providing the one or more data items directly via the operating system.

9. The method of claim 8 wherein the providing the one or more data items directly via the operating system comprises:
   determining a physical memory address of the one or more data items in view of a virtual memory address specified by the first process,
   pinning the one or more data items, and
   providing the one or more data items to the second process.

10. The method of claim 7 further comprising:
    providing, by the computer system, the one or more data items to the second process via the selected device; and
    notifying the first process and the second process of the providing after the providing has completed.

11. The method of claim 7, wherein the processor is a central processing unit.

12. An apparatus comprising:
    a memory to store a pipe; and
    a processor operatively coupled to the memory, the processor to:
    detect a first request by a first process to perform an asynchronous write of one or more data items to the pipe;
    detect, after the first request, a second request by a second process to perform a synchronous read from the pipe; and
    select, in view of a on the size of the one or more data items, one of a direct memory access engine or the processor.

13. The apparatus of claim 12 wherein the selection is also in view of one or both of:
    an availability of the direct memory access engine; and
    an load of the direct memory access engine.

14. The apparatus of claim 12, wherein when providing the one or more data items to the second process by the direct memory access engine the processor is to:
    (a) copy, via the processor, the one or more data items from the first process to a buffer in the memory, and copying, via the processor, the one or more data items from the buffer to the second process; and
    (c) provide the one or more data items directly via the processor.

15. The apparatus of claim 12 wherein the processor is also to notify the first process and the second process of the providing after the providing has completed.

16. The apparatus of claim 12, wherein the processor is a central processing unit.

17. A non-transitory computer readable storage medium, comprising instructions stored therein, which when executed, cause a processor to:
    detect, by the processor, a first request by a first process to perform an asynchronous read from a pipe;
    detect by the processor, after the first request, a second request by a second process to perform an asynchronous write of one or more data items to the pipe; and
    select, by the processor, one of a direct memory access engine or the processor to provide the one or more data items to the second process;
    wherein the selection is in view of one or both of:

the availability of the direct memory access engine, and the load of the direct memory access engine.

18. The non-transitory computer readable storage medium of claim 17, wherein providing the one or more data items to the second process by the direct memory access engine comprises:
   (a) copying, via an operating system, the one or more data items from the second process to a buffer in the memory, and copying, via the operating system, the one or more data items from the buffer to the first process; and
   (b) providing the one or more data items directly via the operating system.

19. The non-transitory computer readable storage medium of claim 18 wherein providing the one or more data items directly via the operating system comprises:
   determining a physical memory address of the one or more data items in view of a virtual memory address specified by the second process,
   pinning the one or more data items, and
   providing the one or more data items to the first process.

20. The non-transitory computer readable storage medium of claim 17, wherein the processor is a central processing unit.

* * * * *